(12) United States Patent
Ishizuka et al.

(10) Patent No.: US 8,179,013 B2
(45) Date of Patent: May 15, 2012

(54) STATOR FOR DYNAMOELECTRIC MACHINE AND METHOD OF MANUFACTURING SAME

(75) Inventors: Atsuo Ishizuka, Nagoya (JP); Tetsuya Gorohata, Anjo (JP)

(73) Assignee: Denso Corporation, Kariya (JP)

( * ) Notice: Subject to any disclaimer, the term of this patent is extended or adjusted under 35 U.S.C. 154(b) by 306 days.

(21) Appl. No.: 12/613,782

(22) Filed: Nov. 6, 2009

(65) Prior Publication Data

US 2010/0117480 A1 May 13, 2010

(30) Foreign Application Priority Data

Nov. 7, 2008 (JP) ................................. 2008-286181

(51) Int. Cl.
*H02K 3/04* (2006.01)
(52) U.S. Cl. ........................................ 310/207; 310/208
(58) Field of Classification Search .................. 310/207, 310/208, 180, 205, 206
See application file for complete search history.

(56) References Cited

U.S. PATENT DOCUMENTS

| | | | | |
|---|---|---|---|---|
| 6,943,477 | B1* | 9/2005 | Nakamura | 310/184 |
| 7,948,142 | B2* | 5/2011 | Dobashi et al. | 310/195 |
| 8,018,112 | B2* | 9/2011 | Dobashi et al. | 310/180 |
| 2004/0040142 | A1 | 3/2004 | Hirota et al. | |
| 2006/0005376 | A1 | 1/2006 | Hirota et al. | |
| 2009/0134737 | A1* | 5/2009 | Maekawa et al. | 310/207 |

FOREIGN PATENT DOCUMENTS

| | | |
|---|---|---|
| EP | 2 124 317 | 11/2009 |
| JP | 2004-104841 | 4/2004 |
| WO | WO 2008/108351 | 9/2008 |

* cited by examiner

*Primary Examiner* — Nguyen N Hanh
(74) *Attorney, Agent, or Firm* — Nixon & Vanderhye PC

(57) ABSTRACT

A stator for a dynamoelectric machine includes a stator core and a stator coil. The stator coil is made up of wave-shaped electric wires mounted on the stator core. Each of the electric wires has in-slot portions, each of which is received in one of slots of the stator core, and connecting portions each of which is located outside of the slots to connect one adjacent pair of the in-slot portions. Each of the connecting portions includes an apex part that is located axially furthest in the connecting portion from the stator core and includes an oblique section extending obliquely with respect to the radial direction of the stator core. Further, the oblique sections of the electric wires on one side of the stator core in the axial direction of the stator core are oblique in the same direction as those on the other side of the stator core.

14 Claims, 17 Drawing Sheets

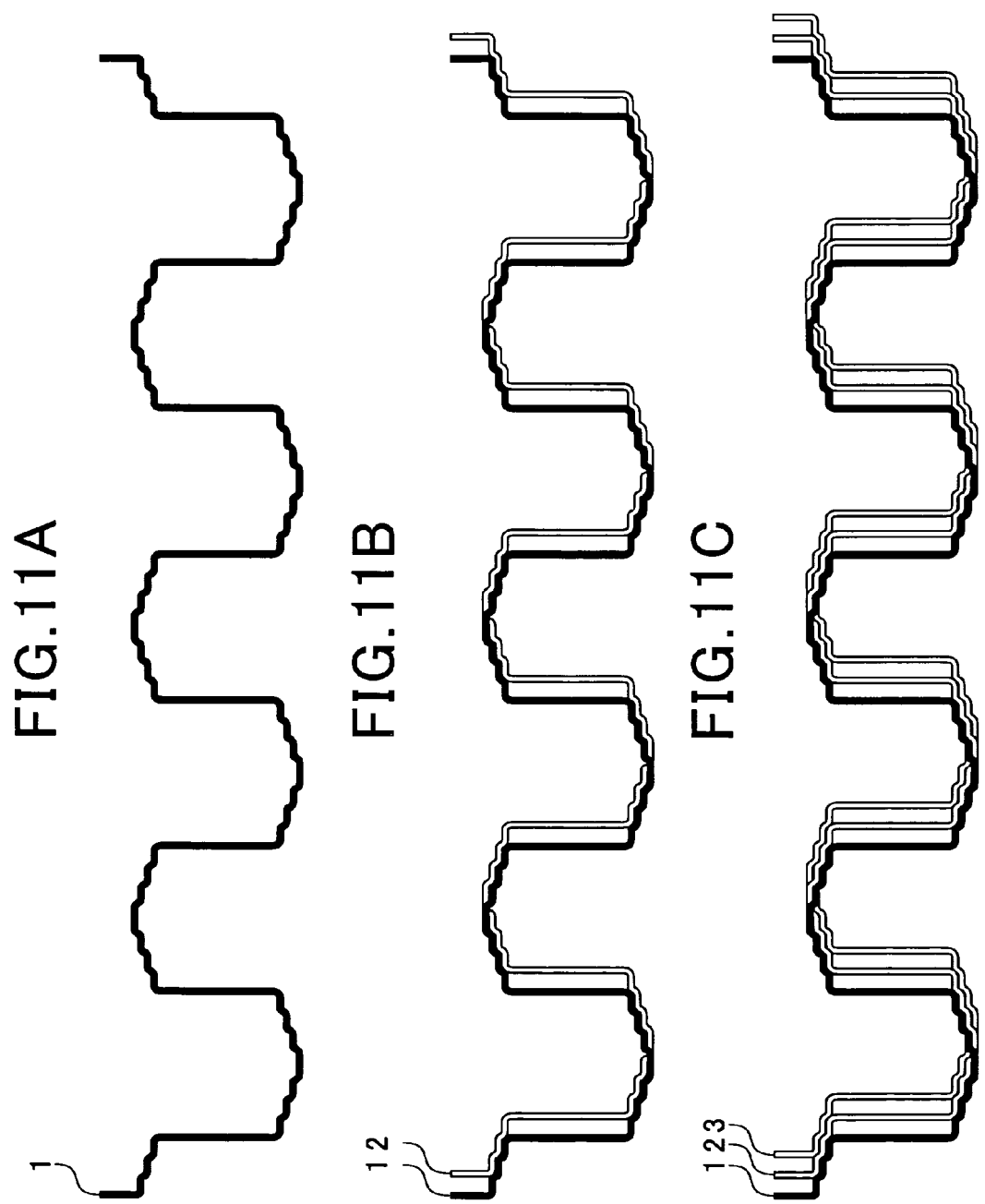

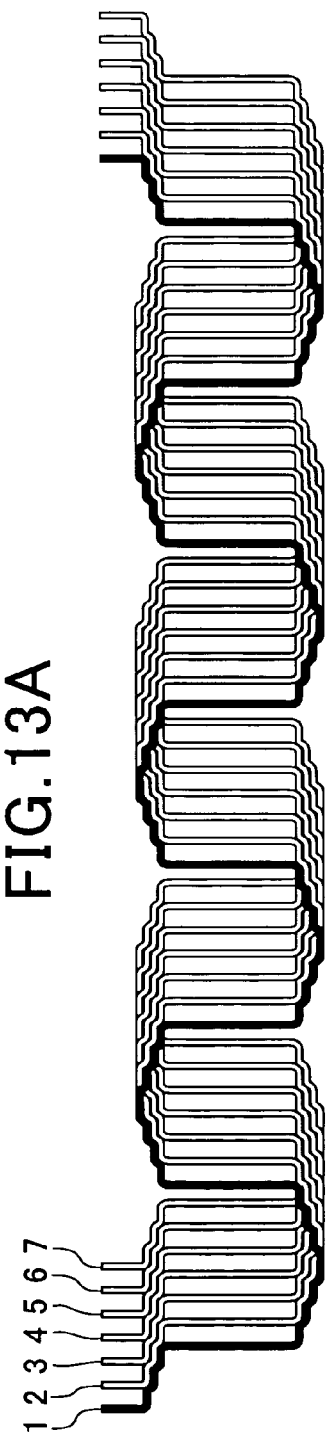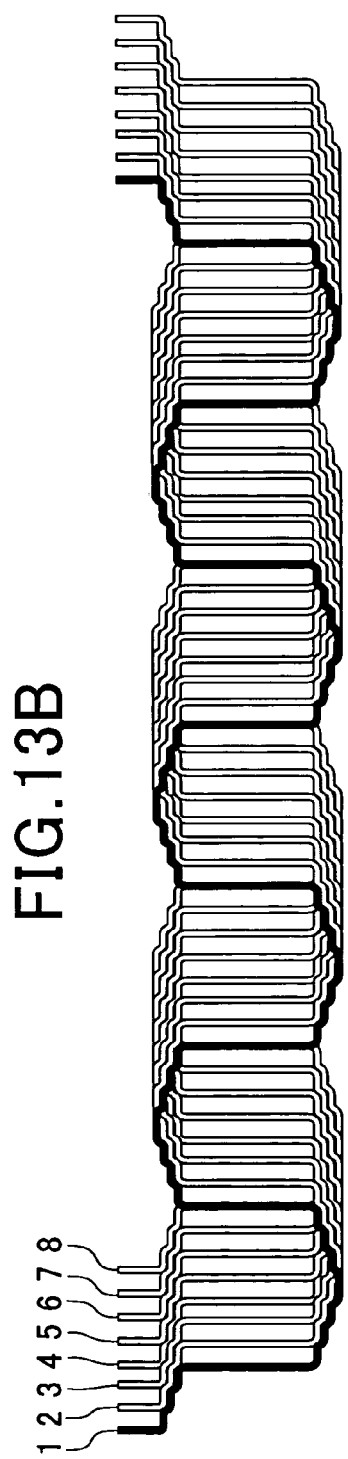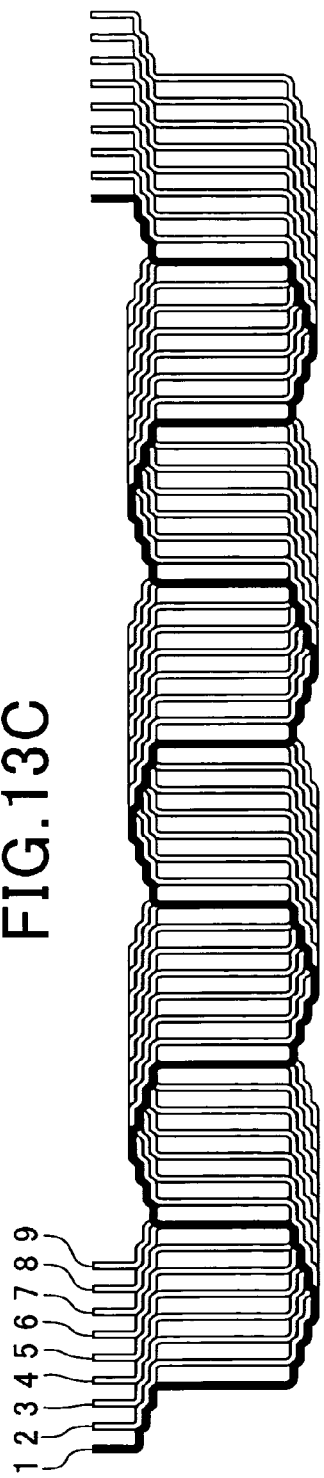

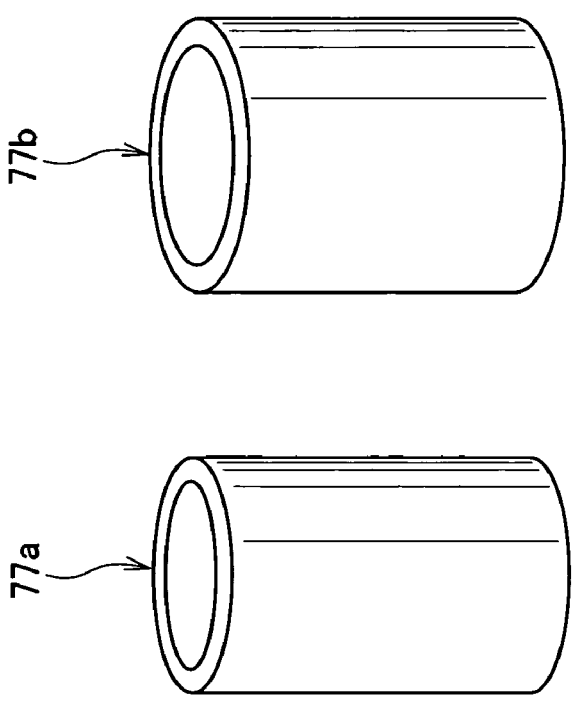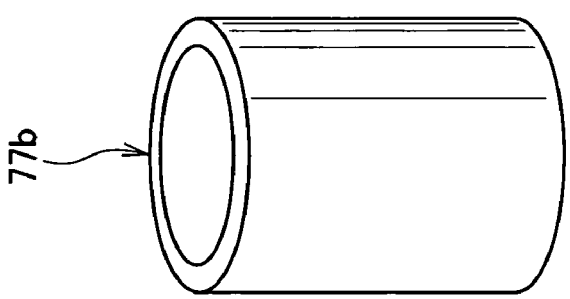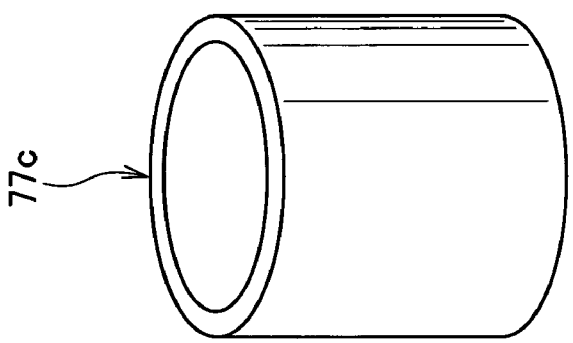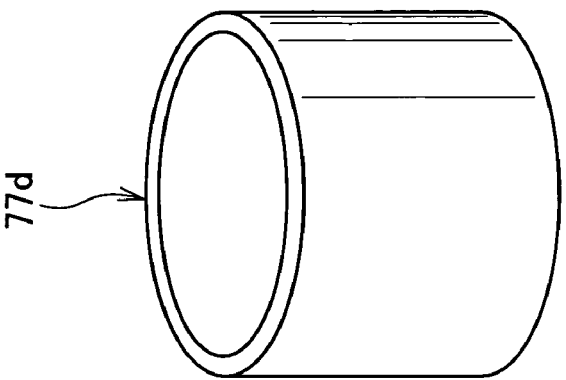

STATOR FOR DYNAMOELECTRIC MACHINE AND METHOD OF MANUFACTURING SAME

CROSS-REFERENCE TO RELATED APPLICATION

This application is based on and claims priority from Japanese Patent Application No. 2008-286181, filed on Nov. 7, 2008, the content of which is hereby incorporated by reference in its entirety into this application.

BACKGROUND OF THE INVENTION

1. Technical Field of the Invention

The present invention relates to stators for dynamoelectric machines that are used in, for example, motor vehicles as electric motors and electric generators, and methods of manufacturing the stators.

2. Description of the Related Art

A dynamoelectric machine, such as an electric motor and an electric generator, generally includes a rotor, a stator, and a housing that accommodates both the rotor and the stator. The rotor is fixed on a rotating shaft that is rotatably supported by the housing. The stator is fixed in the housing so as to surround the radially outer periphery of the rotor. Moreover, the stator includes a hollow cylindrical stator core and a stator coil mounted on the stator core. The stator core has a plurality of slots that are formed in a radially inner surface of the stator core and spaced in the circumferential direction of the stator core at predetermined intervals. The stator coil is made up of a plurality of electric wires mounted on the stator core. Each of the electric wires includes a plurality of in-slot portions, which are received in the slots of the stator core, and a plurality of connecting portions that are located outside of the slots to connect the in-slot portions.

The above stator coil can be formed with a flat band-shaped electric wire assembly that is manufactured by a conventional method disclosed in, for example, Japanese Patent First Publication No. 2004-104841. According to the conventional method, a plurality of electric wires are first formed to have a triangular-wave shape. Then, one of the electric wires is held stationary, and the other electric wires are sequentially woven onto the stationary electric wire to form the flat band-shaped electric wire assembly. More specifically, in the weaving step, each of the other electric wires is repeatedly rotated about its axis by 90° and moved toward the stationary electric wire by a half of its pitch.

Further, the flat electric wire assembly may be rolled by a predetermined number of turns to form a hollow cylindrical electric wire assembly. After that, a plurality of stator core pieces may be mounted to the hollow cylindrical electric wire assembly. Then, the stator core pieces may be joined together, forming the stator in which the hollow cylindrical electric wire assembly makes up the stator coil and the stator core pieces together make up the stator core.

In the stator obtained in such a manner as described above, the axial end portions of the stator coil, which are made up of the connecting portions of the electric wires, protrude from the axial end faces of the stator core. Hereinafter, the axial end portions of the stator coil will be referred to as coil ends of the stator coil. Since each of the connecting portions of the electric wires extends to form the shape of a triangle, the axial end faces of the coil ends become uneven in the extending directions of the connecting portions. Moreover, each of the connecting portions of the electric wires has an apex which is axially furthest in the connecting portion from the stator core.

For each radially-adjacent pair of the connecting portions of the electric wires, the apexes of the connecting portions are circumferentially spaced away from each other by the distance between each circumferentially-adjacent pair of the slots of the stator core. Consequently, the apexes of all the connecting portions of the electric wires together form a plurality of curved ridges, each of which extends obliquely from the radially inner side to the radially outer side of the stator coil, with a plurality of valleys formed between the ridges.

Moreover, during operation of the dynamoelectric machine, the temperature of the stator coil increases due to the electric current flowing therethrough, thereby causing the electric resistance of the stator coil to increase. Therefore, to suppress the increase in the electric resistance of the stator coil, a coolant (e.g., ATF) is supplied to flow along the surfaces of the coil ends and the stator core, thereby cooling the stator coil and the stator core. In addition, as shown in FIG. 18, the coolant flows, with rotation of the rotor of the dynamoelectric machine, from the radially inner side to the radially outer side of the stator core 60A, thereby cooling the axial end faces of the coil ends of the stator coil 70A.

However, with the stator coil formed with the flat band-shaped electric wire assembly manufactured by the conventional method, the flow of the coolant passing the axial end face of one of the coil ends is different from that passing the axial end face of the other coil end.

More specifically, as shown in FIG. 19A, for one of the coil ends of the stator coil 70A, the extending directions of the ridges 700A, which are made up of the apexes of the connecting portions of the electric wires, are coincident with the rotating direction b of the rotor 40A and thus also coincident with the flow direction of the coolant. It should be noted that for the sake of simplicity, only one of the ridges 700A is indicated with a solid line in FIG. 19A. Consequently, the coolant can smoothly flow along the axial end face of the coil end from the radially inner side to the radially outer side of the stator core 60A, thereby effectively cooling the coil end.

In comparison, as shown in FIG. 19B, for the other coil end, the extending directions of the ridges 700A are transverse to the rotating direction b of the rotor 40A and thus also transverse to the flow direction of the coolant. It should be noted that for the sake of simplicity, only one of the ridges 700A is indicated with a solid line in FIG. 19B. Consequently, the coolant cannot smoothly flow along the axial end face of the other coil end, thereby failing to effectively cool the other coil end.

SUMMARY OF THE INVENTION

According to the present invention, there is provided a stator for a dynamoelectric machine which includes a hollow cylindrical stator core and a stator coil. The stator core has a plurality of slots that are formed in a radially inner surface of the stator core and spaced at predetermined intervals in the circumferential direction of the stator core. The stator coil is made up of a plurality of wave-shaped electric wires mounted on the stator core. Each of the electric wires has a plurality of in-slot portions, each of which is received in one of the slots of the stator core, and a plurality of connecting portions each of which is located outside of the slots of the stator core to connect one adjacent pair of the in-slot portions of the electric wire. Each of the connecting portions includes an apex part that is located axially furthest in the connecting portion from the stator core and includes an oblique section; the oblique section extends obliquely with respect to the radial direction of the stator core, Further, in the stator according to the invention, the oblique sections of the apex parts of the connecting portions of the electric wires located on one axial side of the stator core are oblique in the same direction as those located on the other axial side of the stator core.

With the above configuration, when a coolant is supplied to cool the stator, the flow path of the coolant provided on the axial end face of the stator coil on one side of the stator core is identical to that provided on the axial end face of the stator coil on the other side of the stator core. As a result, it is possible to achieve the same cooling effect on both the axial end faces of the stator coil, thereby making it possible to secure high cooling performance of the stator.

In a preferred embodiment of the invention, the oblique angles of the oblique sections of the apex parts of the connecting portions increase from the radially inner side to the radially outer side of the stator core.

The oblique angles of the oblique sections of the electric wires which fall on the same circle are equal to each other.

Each of the connecting portions of the electric wires is stepped to include a plurality of shoulder parts that extend parallel to an axial end face of the stator core from which the connecting portion protrudes. Further, the plurality of shoulder parts include two shoulder parts each of which is adjacent to one of the pair of in-slot portions connected by the connecting portion. There is specified the following dimensional relationship: d1<d2, where d1 is the length of each of the two shoulder parts adjacent to the in-slot portions, and d2 is the distance between each circumferentially-adjacent pair of the slots of the stator core.

For each of the electric wires, the change in radial position of the electric wire caused by one of the oblique sections of the electric wire is substantially equal to the thickness of the electric wire.

Each of the electric wires is made up of an electric conductor having a rectangular cross section and an insulating coat covering the surface of the electric conductor. Further, the insulating coat is two-layer structured to include an inner layer and an outer layer. Furthermore, the inner layer has a higher glass transition temperature than the outer layer.

According to the present invention, there is also provided a method of manufacturing the stator according to the invention. The method includes the steps of: (1) preparing a plurality of electric wires and a plurality of stator core pieces that together make up the stator core; (2) shaping the electric wires to obtain the plurality of wave-shaped electric wires; (3) stacking the wave-shaped electric wires to form a flat band-shaped electric wire assembly; (4) rolling the flat band-shaped electric wire assembly by a predetermined number of turns to form the stator coil which has a hollow cylindrical shape; and (5) assembling the stator core pieces to the stator coil to form the stator.

According to the present invention, there is also provided another method of manufacturing the stator according to the invention. This other method includes the steps of: (1) preparing a plurality of electric wires and a plurality of stator core pieces that together make up the stator core; (2) shaping the electric wires to obtain the plurality of wave-shaped electric wires, wherein the plurality of wave-shaped electric wires are classified into a plurality of groups so that the wave-shaped electric wires in the same group have the same length, but those in different groups have different lengths; (3) stacking the wave-shaped electric wires in groups to form a plurality of flat band-shaped electric wire assemblies which have different lengths; (4) rolling the flat band-shaped electric wire assemblies separately by a single turn to form a plurality of hollow cylindrical electric wire assemblies which have different inner and outer diameters; (5) assembling the hollow cylindrical electric wire assemblies to form the stator coil; and (6) assembling the stator core pieces to the stator coil to form the stator.

In the above methods according to the invention, it is preferable that for each of the wave-shaped electric wires obtained by the shaping step, all of the oblique sections of the apex parts of the connecting portions are oblique in the same direction with respect to the longitudinal axis of the wave-shaped electric wire.

BRIEF DESCRIPTION OF THE DRAWINGS

The present invention will be understood more fully from the detailed description given hereinafter and from the accompanying drawings of preferred embodiments of the invention, which, however, should not be taken to limit the invention to the specific embodiments but are for the purpose of explanation and understanding only.

In the accompanying drawings:

FIGS. 11A-11C, 12A-12C, 13A-13C, and 14A-14C are schematic views illustrating an electric wire assembly-forming step in manufacturing the stator according to the first embodiment;

FIGS. 16A-16D are perspective views showing hollow cylindrical electric wire assemblies for forming a stator coil according to the second embodiment of the invention;

DESCRIPTION OF PREFERRED EMBODIMENTS

Figure 1:
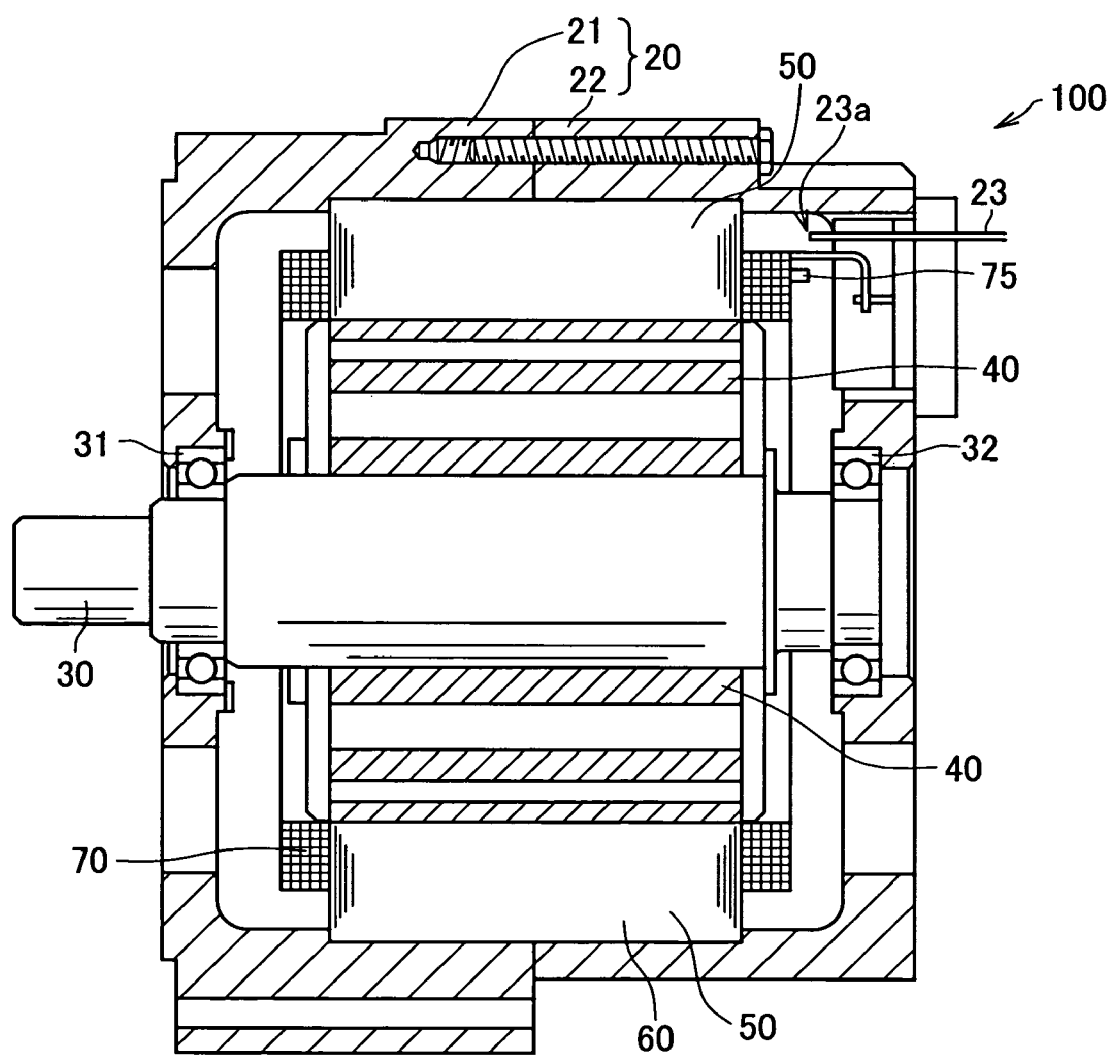
FIG. 1 is a schematic cross-sectional view showing the overall configuration of a dynamoelectric machine which includes a stator according to the first embodiment of the invention.

Preferred embodiments of the present invention will be described hereinafter with reference to FIGS. 1-17. It should be noted that, for the sake of clarity and understanding, identical components having identical functions in different embodiments of the invention have been marked, where possible, with the same reference numerals in each of the figures.

First Embodiment

FIG. 1 shows the overall configuration of a dynamoelectric machine 100 which includes a stator 50 according to the first embodiment of the invention.

The dynamoelectric machine 100 is configured to function as either an electric generator or an electric motor in a motor vehicle, such as an electric vehicle or a hybrid vehicle.

As shown in FIG. 1, the dynamoelectric machine 100 further includes a housing 20 and a rotor 40 in addition to the stator 50. The housing 20 is composed of a pair of cup-shaped housing pieces 21 and 22 which are jointed together at the open ends thereof. The housing 20 has a pair of bearings 31 and 32 mounted therein, via which a rotating shaft 30 is rotatably supported by the housing 20. The rotor 40 is received in the housing 20 and fixed on the rotating shaft 30. The stator 50 is fixed in the housing 20 so as to surround the radially outer periphery of the rotor 40.

The rotor 40 includes a permanent magnet that is provided on a radially outer periphery of the rotor 40 facing a radially inner periphery of the stator 50. The permanent magnet has formed therein a plurality of magnetic poles that are arranged in the circumferential direction of the rotating shaft 30 at predetermined intervals. The magnetic poles are so magnetized that the polarities of the magnetic poles alternate between N (North) and S (South) in the circumferential direction of the rotating shaft 30. The number of the magnetic poles is dependent on the type of the dynamoelectric machine 100. In the present embodiment, the number of the magnetic poles is set to eight (i.e., four N poles and four S poles).

Figure 2:
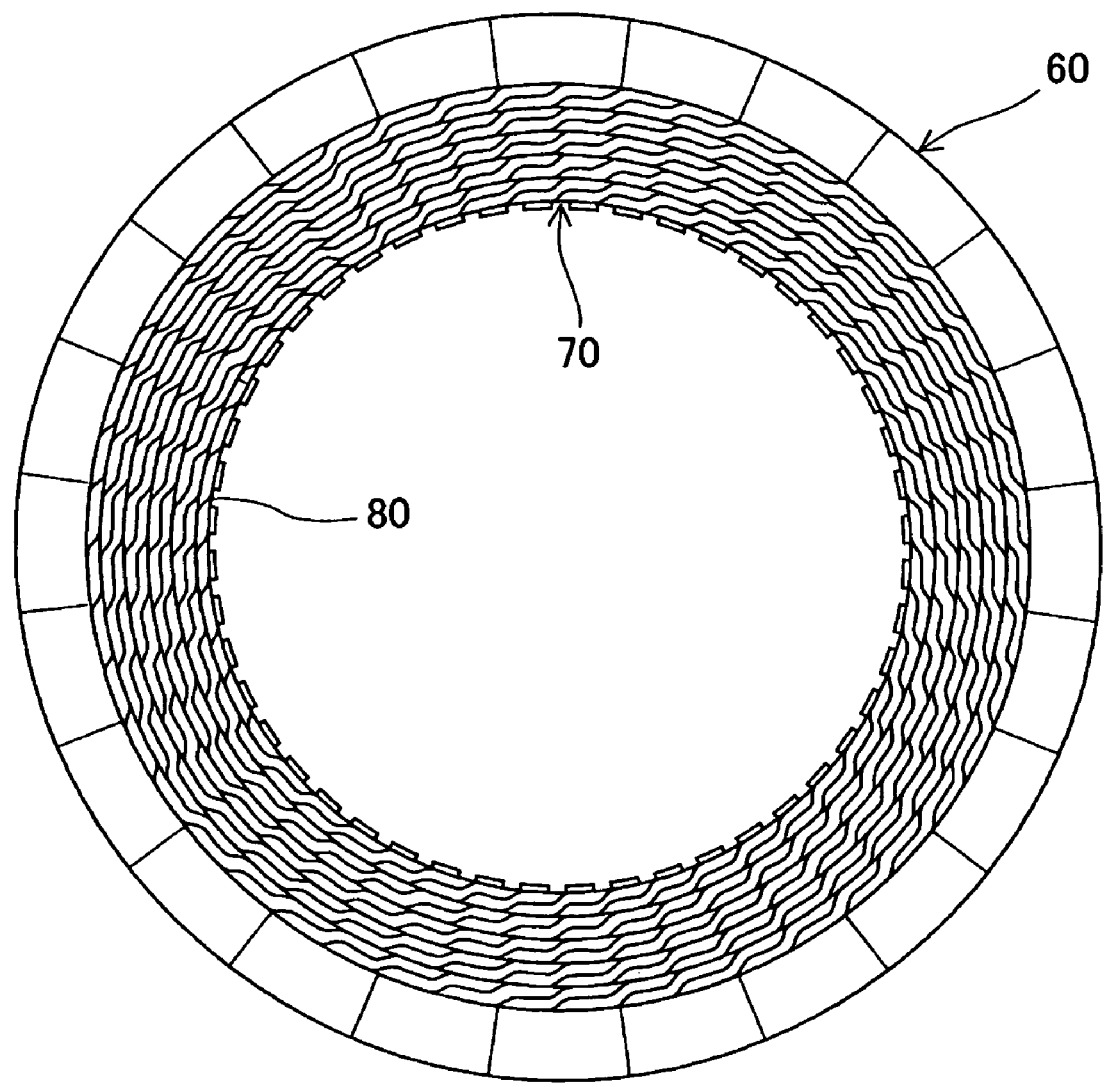
FIG. 2 is an end view of the stator.
Figure 3:
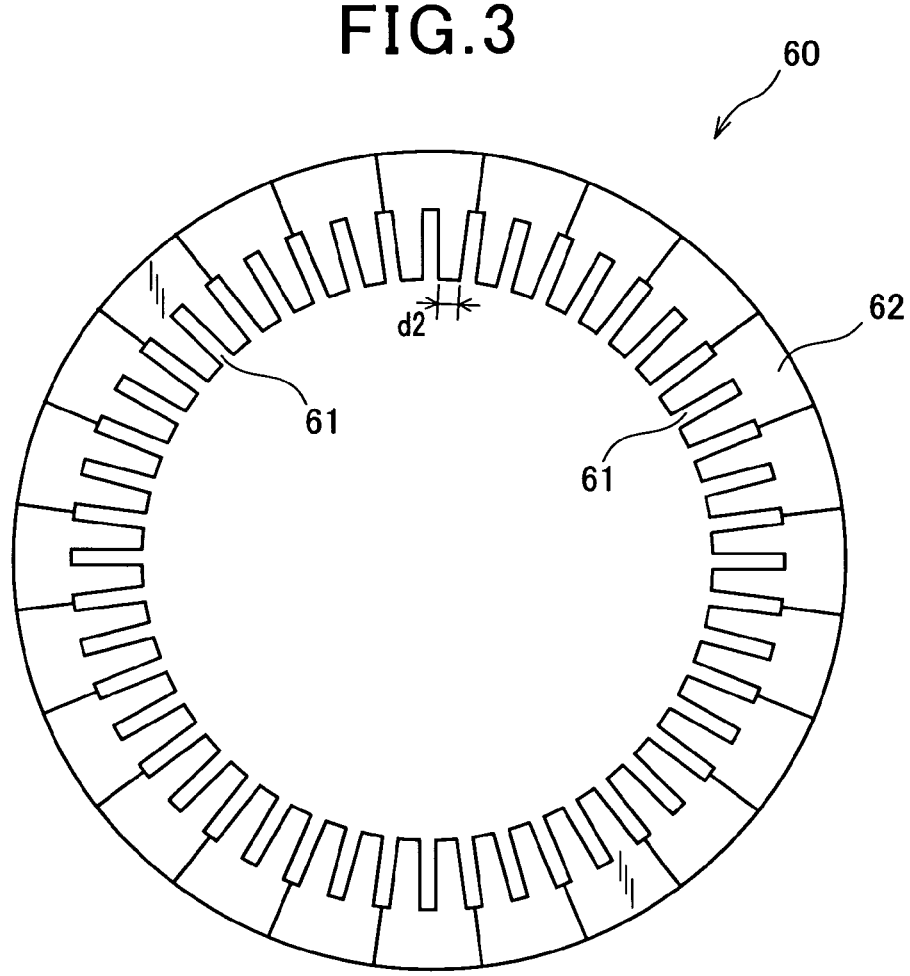
FIG. 3 is an end view of a stator core of the stator.

The stator 50 includes, as shown in FIGS. 1-3, a hollow cylindrical stator core 60 and a three-phase stator coil 70 mounted on the stator core 60. The stator core 60 has a plurality of slots 61 that are formed in the radially inner surface of the stator core 60 and spaced in the circumferential direction of the stator core 60 at predetermined intervals. The stator coil 70 has a plurality of in-slot portions received in the slots 61 of the stator core 60 and an opposite pair of axial end portions respectively protruding from the axial end faces of the stator core 60. Hereinafter, the axial end portions of the stator coil 70 will be referred to as coil ends of the stator coil 70. In addition, the stator 50 may further include an insulating paper interposed between the stator core 60 and the stator coil 70. The detailed configuration of the stator 50 will be described later.

The dynamoelectric machine 100 further includes a coolant supplier (not shown), a coolant collector (not shown), and a coolant recirculator (not shown). The coolant supplier supplies a coolant for cooling both the rotor 40 and the stator 50 from the outside to the inside of the housing 20 via coolant pipes 23. It should be noted that though there is shown only one coolant pipe 23 in FIG. 1, the dynamoelectric machine 100 actually includes at least two coolant pipes 23 that are respectively axially located on opposite sides of the stator 50. As shown in FIG. 1, each of the coolant pipes 23 extends through an axial end wall of the housing 20 to have an open end thereof located vertically upward of a corresponding one of the coil ends of the stator coil 70. At the open end of each of the coolant pipes 23, there is formed a coolant discharge outlet 23a through which the coolant is discharged into the inside of the housing 20. The coolant collector collects the coolant discharged into the inside of the housing 20. The coolant recirculator recirculates the coolant collected by the coolant collector back to the coolant supplier. In addition, in the present embodiment, ATF (Automotive Transmission Fluid) is used as the coolant for cooling both the rotor 40 and the stator 50. It should be noted that other conventional coolants, such as cooling oil, may also be used instead of ATF.

Referring now to FIG. 3, in the stator core 60, each of the slots 61 has a depth in the radial direction of the stator core 60. In the present embodiment, for each of the eight magnetic poles of the rotor 40 and for each of the three phases of the stator coil 70, two slots 61 are provided. Accordingly, the total number of the slots 61 provided in the stator core 60 is equal to 48 (i.e., 8×3×2).

Figure 4:
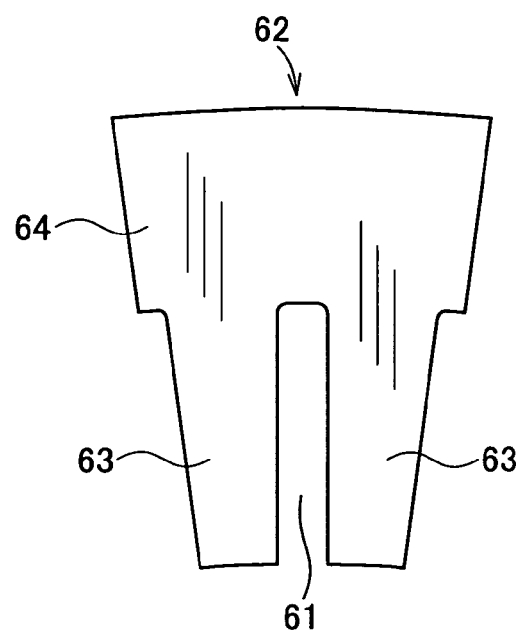
FIG. 4 is an end view of one of stator core pieces which together make up the stator core.

Moreover, in the present embodiment, the stator core 60 is made up of, for example, 24 stator core pieces 62 as shown in FIG. 4. Each of the stator core pieces 62 defines therein one of the slots 61. Further, each circumferentially-adjacent pair of the stator core pieces 62 together defines one of the slots 61 therebetween. More specifically, each of the stator core pieces 62 has a pair of tooth portions 63 each extending radially inward and a back core portion 64 that is provided radially outward of the tooth portions 62 to connect them together. After assembly of the stator core 60, all of the back core portions 64 of the stator core pieces 62 are disposed to adjoin one another in the circumferential direction of the stator core 60.

In addition, in the present embodiment, each of the stator core pieces 62 is formed by laminating a plurality of magnetic steel sheets with a plurality of insulting films interposed therebetween. It should be noted that other conventional metal sheets may also be used instead of the magnetic steel sheets.

Figure 5A:
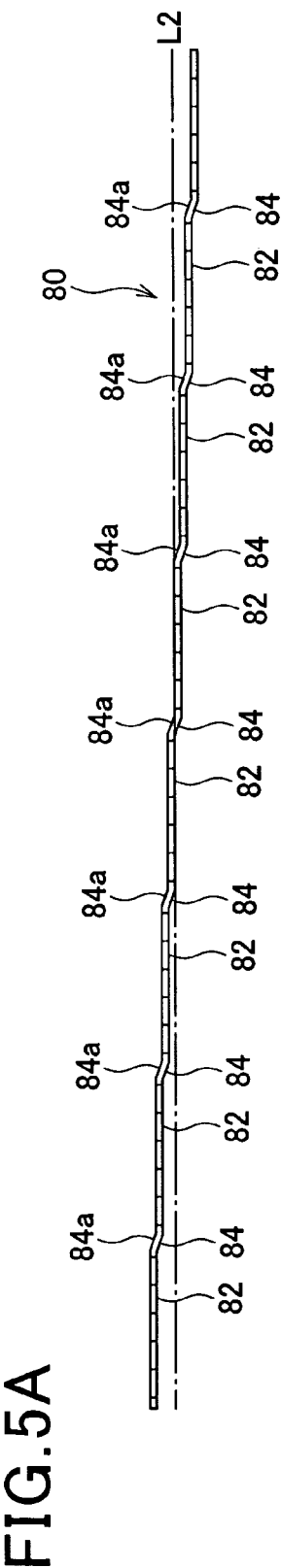
FIGS. 5A-5C are respectively a rear end view, a top view, and a front end view of one of electric wires which together make up a stator coil of the stator.
Figure 5B:
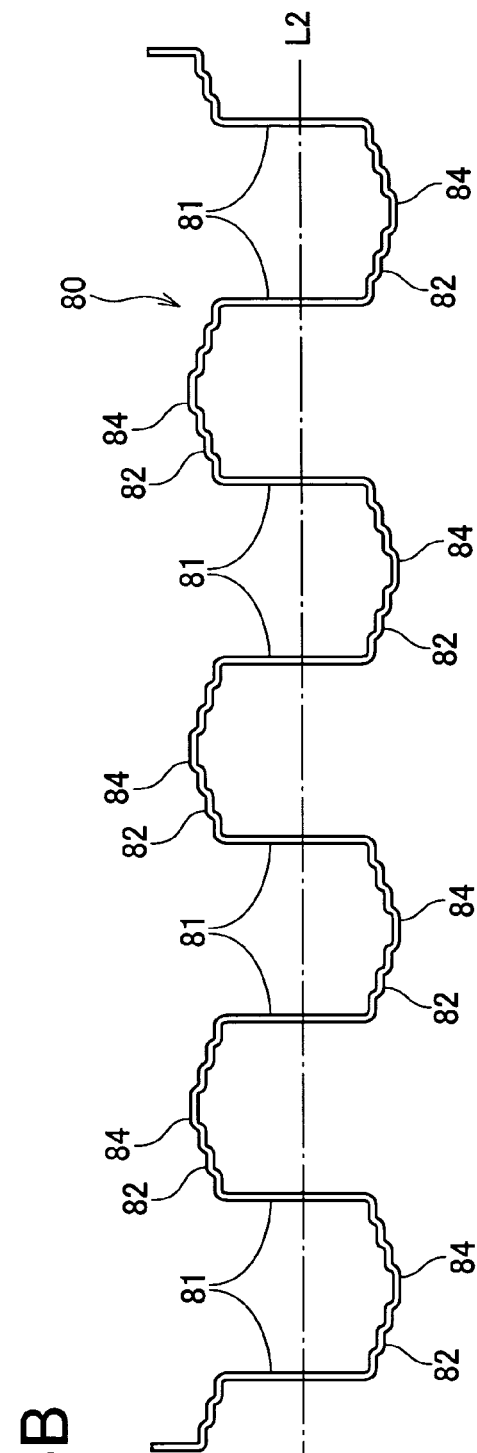
Figure 5C:
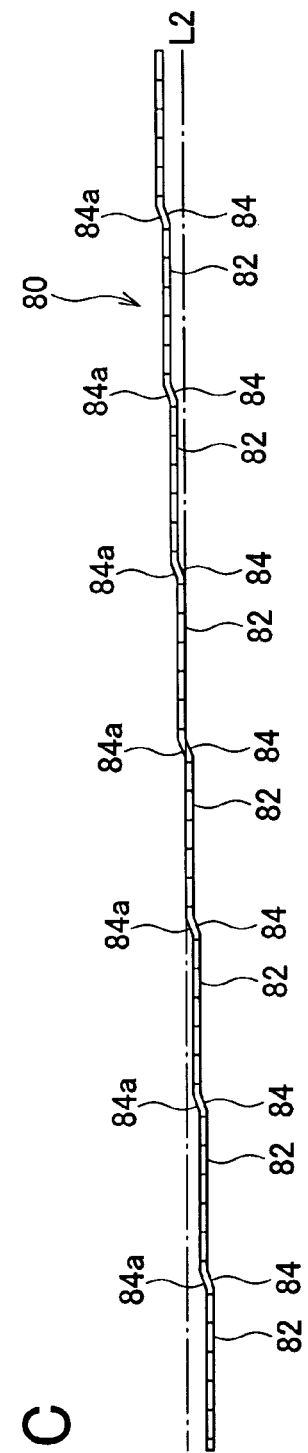
Figure 14A:
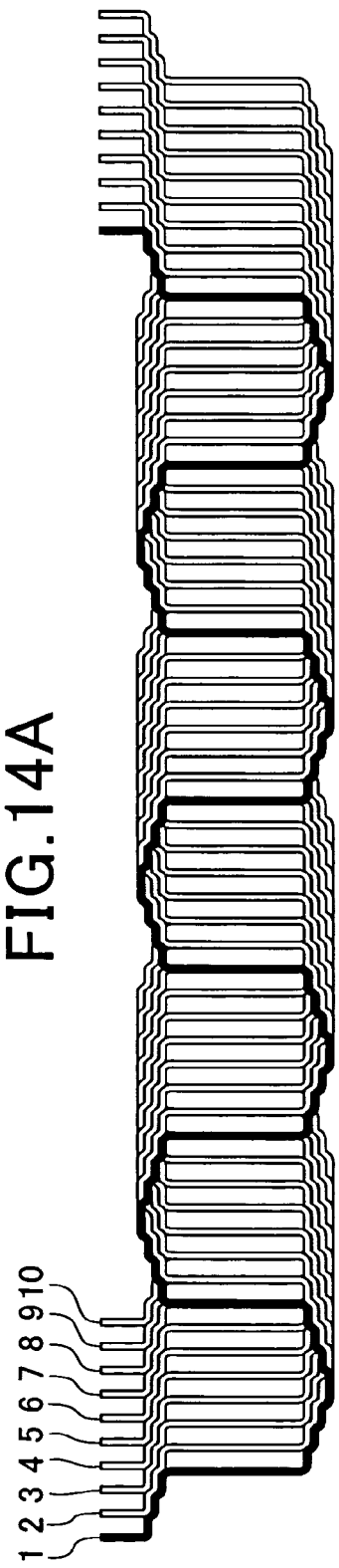
Figure 14B:
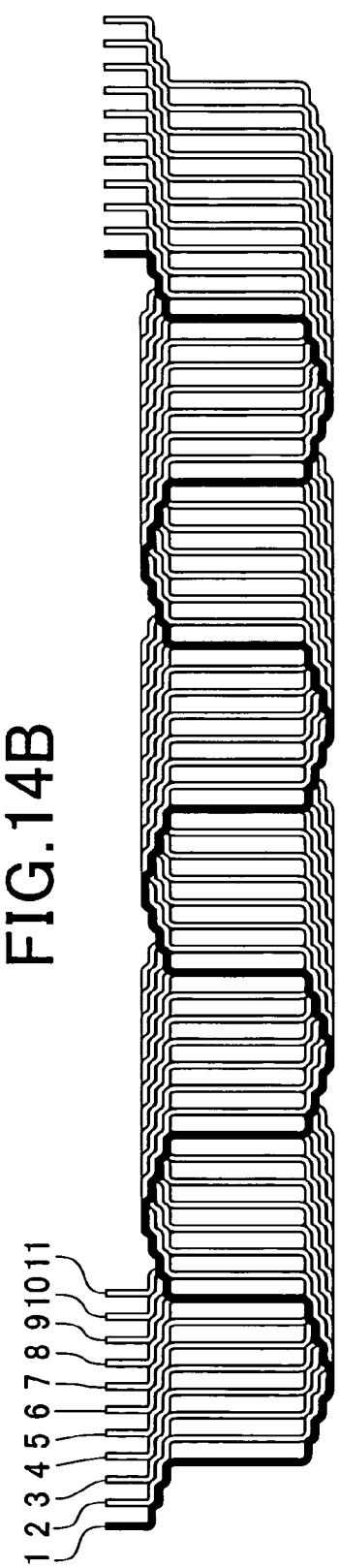
Figure 14C:
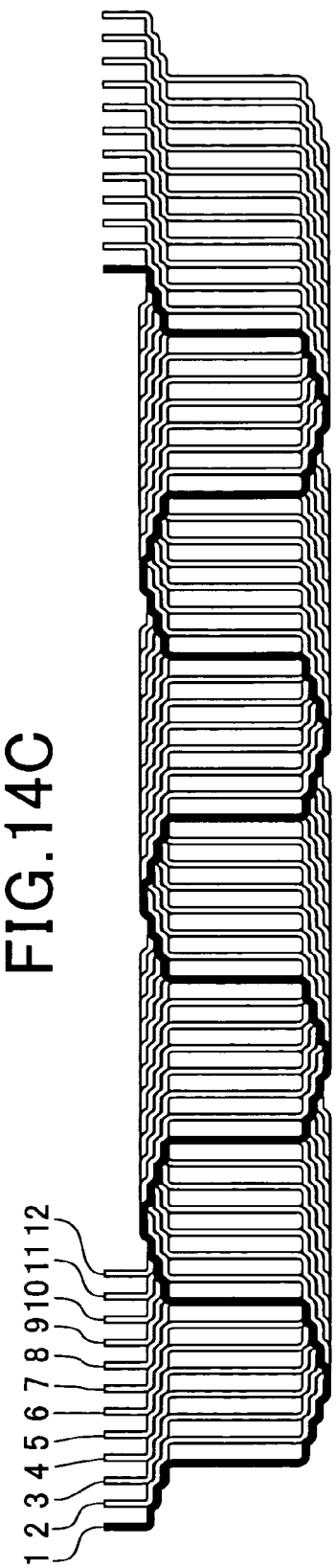

The stator coil 70 is manufactured by stacking a plurality of wave-shaped electric wires 80 as shown in FIG. 5A-5C to form a flat band-shaped electric wire assembly 71 as shown in FIG. 14C and rolling the flat band-shaped electric wire assembly 71 by a predetermined number of turns into a hollow cylindrical shape. The manufacturing method of the stator coil 70 according to the present embodiment will be described in detail later.

Figure 9A:
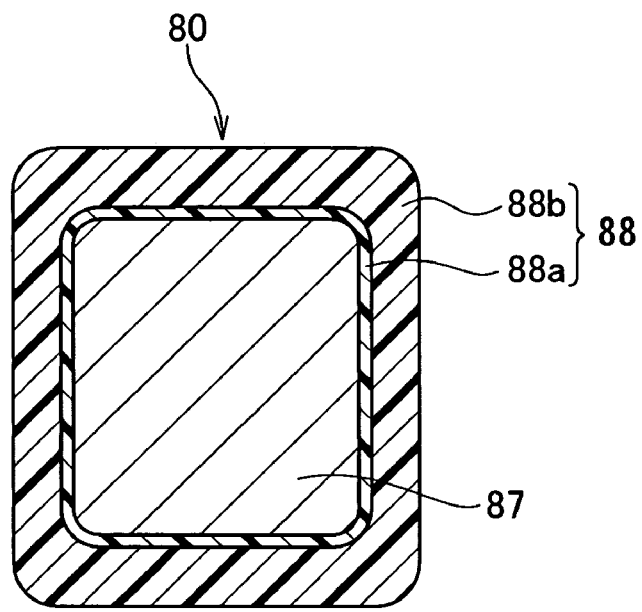
FIG. 9A is a cross-sectional view illustrating the configuration of the electric wires for forming the stator coil according to the first embodiment.

Each of the electric wires 80 for forming the stator coil 70 is configured with, as shown in FIG. 9A, an electric conductor 87 and an insulating coat 88 that covers the surface of the electric conductor 87. In the present embodiment, the electric conductor 87 is made of copper and has a rectangular cross section. With the rectangular cross section, it is possible to mount the electric wires 80 on the stator core 60 at high density.

Further, in the present embodiment, the insulating coat 88 is two-layer structured to include an inner layer 88a and an outer layer 88b. The thickness of the insulating coat 88 (i.e., the sum of thicknesses of the inner and outer layers 88a and 88b) is set to be in the range of 100 to 200 μm.

With the above two-layer structured insulating coat 88, it is possible to reliably insulate the electric wires 80 from one another without interposing insulating paper sheets between the electric wires 80. However, it is also possible to interpose insulating paper sheets between the electric wires 80 so as to enhance the electrical insulation therebetween.

Furthermore, the outer layer 88b is made of an insulating material such as nylon. The inner layer 88a is made of an insulating material having a higher glass transition temperature than the outer layer 88b, such as a thermoplastic resin or a polyamide-imide resin. Consequently, the outer layer 88b will be softened by the heat generated by operation of the dynamoelectric machine 100 earlier than the inner layer 88a, thereby bonding together those portions of the electric wires 80 which are inserted in the same ones of the slots 61 of the stator core 60. As a result, those portions of the electric wires 80 will be integrated into a rigid body, thereby enhancing the mechanical strength thereof. In addition, when excessive vibration occurs, the outer layer 88b will be separated from the inner layer 88a, thereby leaving the inner layer 88a to keep covering the surface of the electric conductor 87. As a result, the electrical insulation between the electric wires 80 can be secured.

Figure 9B:
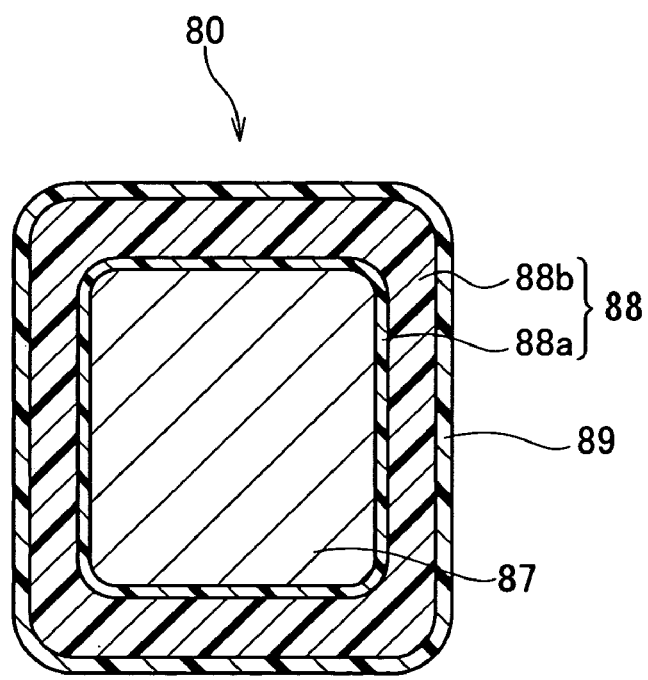
FIG. 9B is a cross-sectional view illustrating a modification of the configuration of the electric wires shown in FIG. 9A.

Furthermore, as shown in FIG. 9B, it is also possible for each of the electric wires 80 to further include a fusible coat 89 to cover the outer surface of the insulating coat 88; the fusible coat 89 may be made, for example, of epoxy resin. In this case, the fusible coats 89 of the electric wires 80 will be fused by the heat generated by operation of the dynamoelectric machine 100 earlier than the insulating coat 88, thereby bonding together those portions of the electric wires 80 which are inserted in the same ones of the slots 61 of the stator core 60. As a result, those portions of the electric wires 80 are integrated into a rigid body, thereby enhancing the mechanical strength thereof. In addition, in this case, the insulating coat 88 may also be made of PPS (polyphenylene sulfide) to have a single layer structure.

FIGS. 5A-5C show one of the electric wires 80 before it is mounted to the stator core 60 to make up the stator coil 70. It should be noted that all of the electric wires 80 are identical to each other in the present embodiment. Therefore, for the sake of avoiding redundancy, only the structure of one of the electric wires 80 will be described hereinafter.

As shown in FIGS. 5A-5C, the electric wire 80 is wave-shaped to include a plurality of in-slot portions 81, each of which is to be received in one of the slots 61 of the stator core 60, and a plurality of connecting portions 82 each of which connects one adjacent pair of the in-slot portions 81 and is to be located outside of the slots 61 of the stator core 60. The in-slot portions 81 are arranged at predetermined intervals in the longitudinal direction of the electric wire 80 and extend straight in parallel with each other.

Each of the connecting portions 82 includes an apex part 84 which is to be located axially furthest in the connecting portion 82 from the corresponding axial end face of the stator core 60 and extend parallel to the corresponding axial end face. As shown in FIGS. 5A and 5C, the apex part 84 is crank-shaped to include an oblique section 84a that extends obliquely with respect to other parts of the connecting portion 82 on a plane perpendicular to the in-slot portions 81 of the electric wire 80.

Figure 8:
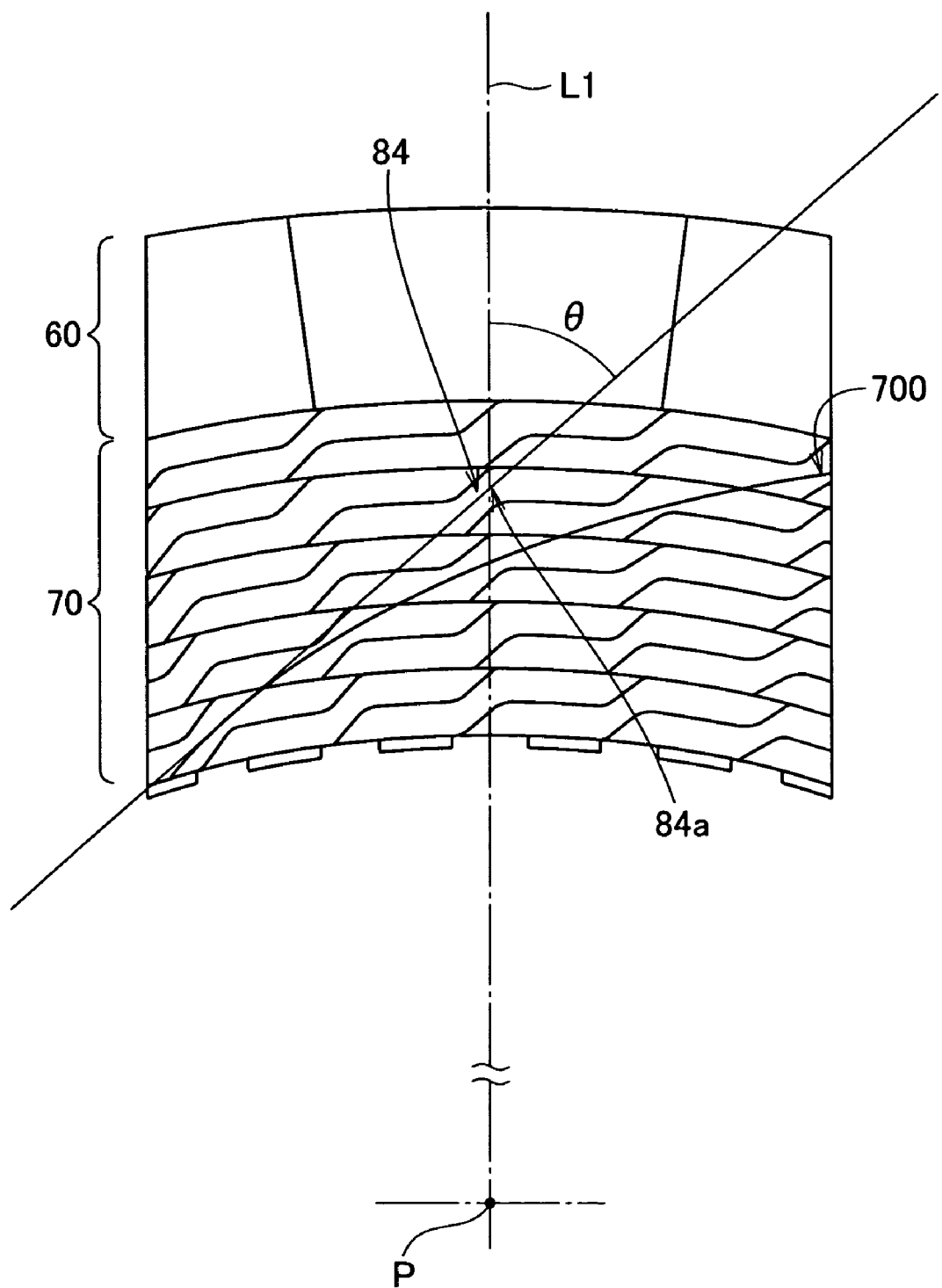
FIG. 8 is a schematic view showing oblique sections provided in the electric wires for forming the stator coil according to the first embodiment.

Further, as shown in FIG. 8, after the electric wire 80 is mounted to the stator core 60, the oblique section 84a extends obliquely with respect to a reference line L1 with an oblique angle θ between the oblique section 84a and the reference line L1; the oblique angle θ is greater than 0° and less than 90°. Here, the reference line L1 is defined to extend radially from the axis P of the stator core 60 through the center of apex part 84. Accordingly, the oblique section 84a extends, in other words, obliquely with respect to the radial direction of the stator core 60.

Moreover, in the present embodiment, for each of the electric wires 80, the oblique angles θ of the oblique sections 84a gradually increase from the radially inner side to the radially outer side of the stator core 60. Consequently, all the apex parts 84 of the connecting portions 82 of the electric wires 80 together form a plurality of ridges 700 each of which extends obliquely from the radially inner side to the radially outer side of the stator core 60 in a slow curve. It should be noted that for the sake of simplicity, only one of the ridges 700 is indicated with a solid line in FIG. 8. As a result, when the extending directions of the ridges 700 are coincident with the rotating direction of the rotor 40, the coolant can smoothly flow from the radially inner side to the radially outer side of the stator core 60 along the valleys formed between the ridges 700, thereby effectively cooling both the stator coil 70 and the stator core 60.

Furthermore, in the present embodiment, the oblique angles θ of the oblique sections 84a of the electric wires 80 which fall on the same circle (in other words, have the same radial position) are equal to each other. Consequently, it is possible to uniformize the cooling effect in the circumferential direction of the stator core 60 on both the axial end faces of the stator coil 70.

Referring back to FIGS. 5A-5C, in the present embodiment, the electric wire 80 is so shaped that with respect to the longitudinal axis L2 of the electric wire 80, all of the oblique sections 84a of the apex parts 84 of the connecting portions 82 oblique (or slant) in the same direction. More specifically, with respect to the longitudinal axis L2, the oblique sections 84a of the apex parts 84 of the connecting portions 82 on the front side (i.e., the lower side in FIG. 5B) are oblique in the same direction as those on the rear side (i.e., the upper side in FIG. 5B).

Figure 7A:
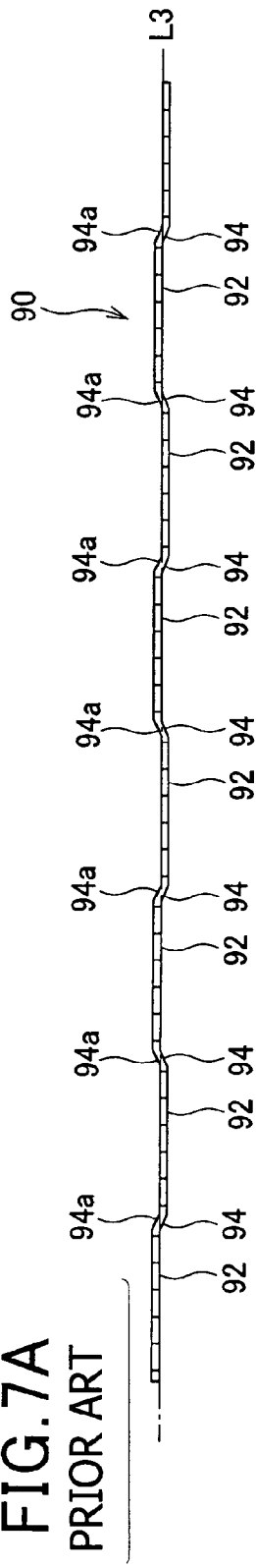
FIGS. 7A-7C are respectively a rear end view, a top view, and a front end view of one of electric wires for forming a stator coil using a conventional method.
Figure 7B:
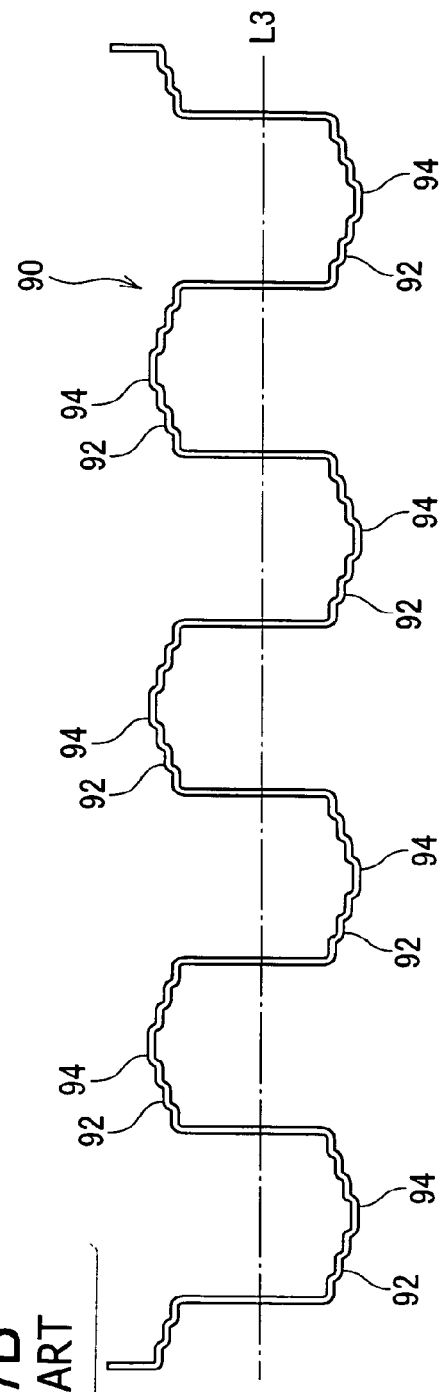
Figure 7C:
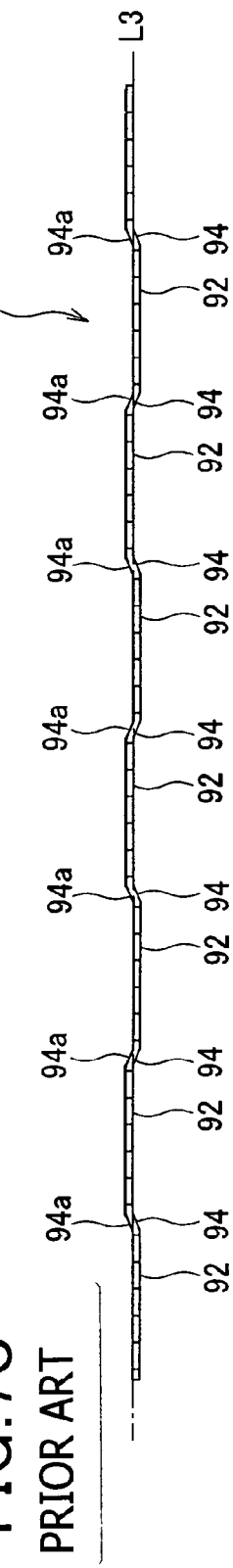

In comparison, in the case of applying the conventional method disclosed in Japanese Patent First Publication No. 2004-104841, the flat band-shaped electric wire assembly is manufactured by using, for example, electric wires 90 as shown FIGS. 7A-7C. Each of the electric wires 90 is so shaped that with respect to the longitudinal direction L3 of the electric wire 90, the oblique sections 94a of the apex parts 94 of the connecting portions 92 on the front side (i.e., the lower side in FIG. 7B) are oblique in the opposite direction to those on the rear side (i.e., the upper side in FIG. 7B).

Referring again to FIG. 8, in the present embodiment, for each of the electric wires 80, the change in radial position of the electric wire 80 caused by one of the oblique sections 84a of the apex parts 84 of the connecting portions 82 is substantially equal to the thickness of the electric wire 80. Consequently, each radially-adjacent pair of the connecting portions 82 of the electric wires 80 can be brought into contact with each other. As a result, the radial width of the coil ends of the stator coil 70 can be minimized, thereby preventing the stator coil 70 from radially protruding from the stator core 60.

Figure 6:
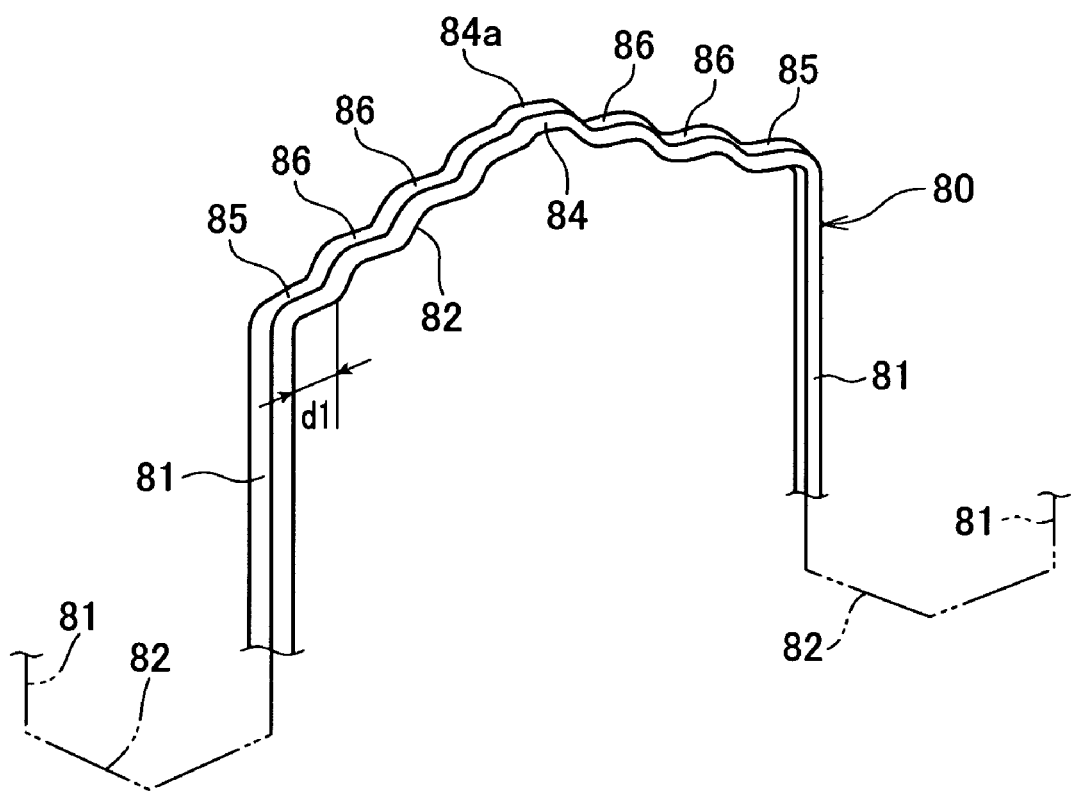
FIG. 6 is a perspective view showing a connecting portion of one of the electric wires.

Further, in the present embodiment, as shown in FIG. 6, each of the connecting portions 82 includes a pair of shoulder parts 85 which are respectively adjacent to the pair of in-slot portions 81 connected by the connecting portion 82 and both extend perpendicular to the in-slot portions 81 (or parallel to the corresponding axial end face of the stator core 70). Consequently, with the shoulder parts 85, the height of each of the connecting portions 82 (i.e., the axial length of the coil ends of the stator coil 70) can be reduced.

Furthermore, in the present embodiment, there is specified the following dimensional relationship: d1<d2, where d1 is the length of each of the shoulder parts 85 of the connecting portions 82 of the electric wires 80 as shown in FIG. 6, and d2 is the distance between each circumferentially-adjacent pair of the slots 61 of the stator core 60 as shown in FIG. 3. Specifying the above relationship, it is possible to prevent interference between each pair of the connecting portions 82 of the electric wires 80 which respectively protrude from one circumferentially-adjacent pair of the slots 61 of the stator core 60. Consequently, it is possible to prevent both the axial length and radial width of the coil ends of the stator coil 70 from being increased for the purpose of preventing the above-described interference.

Referring again to FIG. 6, each of the connecting portions 82 of the electric wires 80 further includes two shoulder parts 86 between the apex part 84 and each of the shoulder parts 85. Accordingly, each of the connecting portions 82 of the electric wires 80 includes a total of seven parts, i.e., one apex part 84 and six shoulder parts 85 and 86. Each of the shoulder parts 86 extends, like the shoulder parts 85, perpendicular to the in-slot portions 81 (or parallel to the corresponding axial end face of the stator core 70). Consequently, with the shoulder parts 86, the height of each of the connecting portions 82 (i.e., the axial length of the coil ends of the stator coil 70) can be further reduced. In addition, each of the connecting portions 82 can be seen as being stepped on both sides of the apex part 84 to reduce the height thereof.

Figure 10:
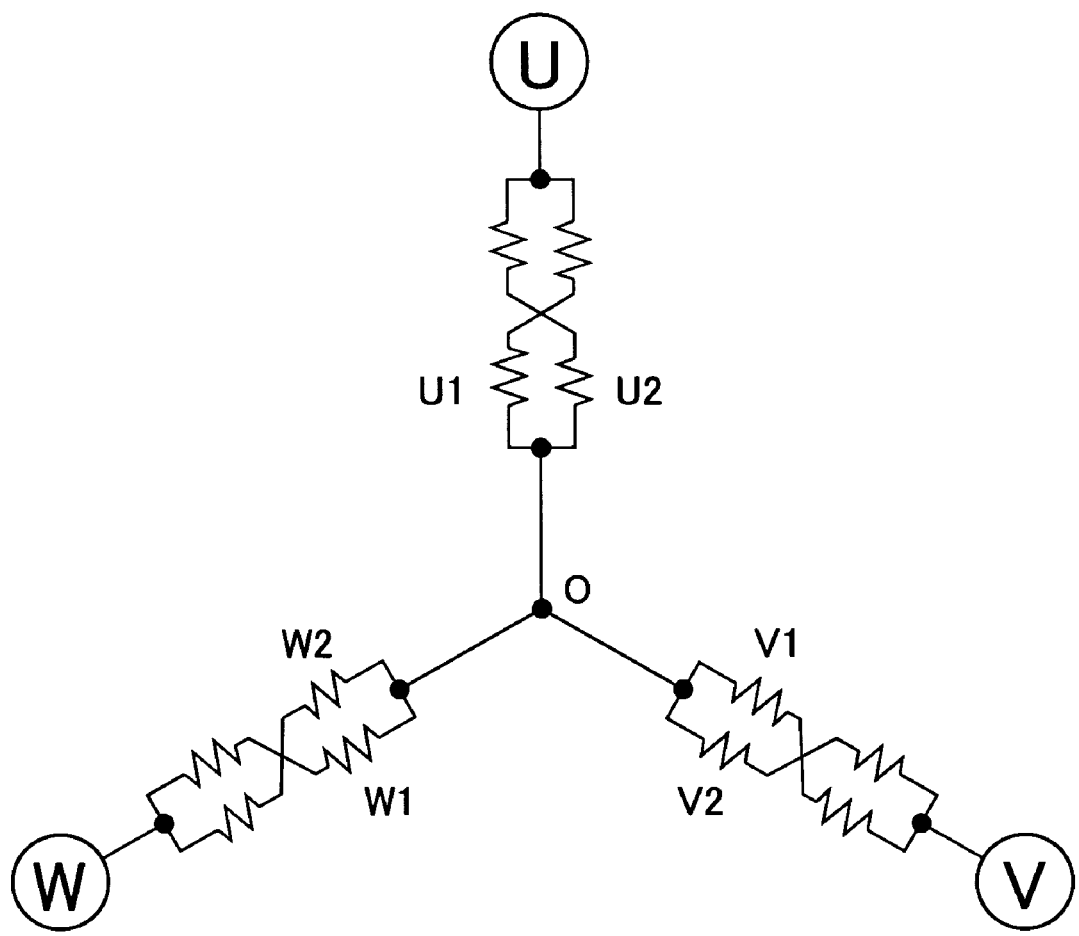
FIG. 10 is a schematic circuit diagram of the stator according to the first embodiment.
Figure 12A:
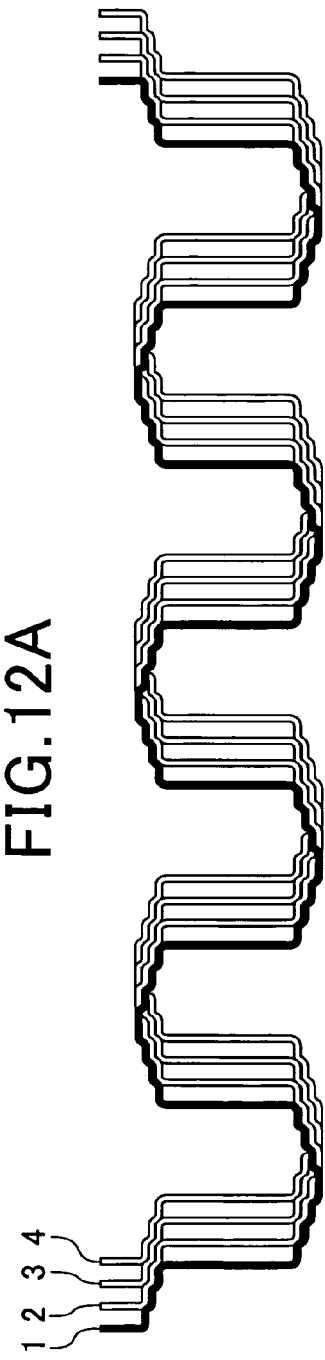
Figure 12B:
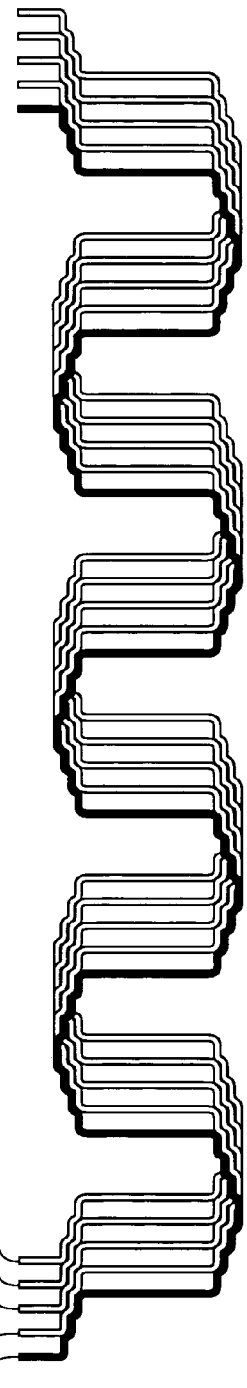
Figure 12C:
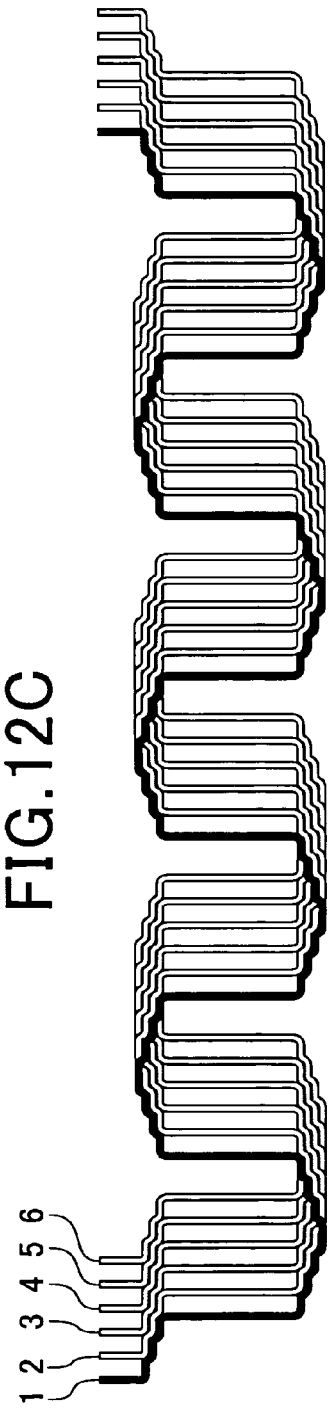

In the present embodiment, as shown in FIG. 10, the stator coil 70 is made up of six phase windings U1, U2, V1, V2, W1, and W2. The phase windings U1 and U2 are connected in parallel with each other to make up a U-phase winding of the stator coil 70. Similarly, the phase windings V1 and V2 are connected in parallel with each other to make up a V-phase winding of the stator coil 70. The phase windings W1 and W2 are connected in parallel with each other to make up a W-phase winding of the stator coil 70. Moreover, the U-phase, V-phase, and W-phase windings are Y-connected to have a neutral point O therebetween.

Further, in the present embodiment, each of the six phase windings U1, U2, V1, V2, W1, and W2 of the stator coil 70 is formed by joining a pair of the electric wires 80 by, for example, welding. Accordingly, the number of the electric wires 80 used for forming the stator coil 70 is equal to 12.

Each of the electric wires 80 is wave-wound around the stator core 60 so as to extend in the circumferential direction of the stator core 60. In the present embodiment, the slots 61 of the stator core 60 are divided into eight groups each of which includes six circumferentially-adjacent slots 61. For each of the electric wires 80, all of the in-slot portions 81 of the electric wire 80 are received in eight slots 61 that belong respectively to the eight groups and are spaced five slots 61 apart in the circumferential direction of the stator core 60. Further, for each of the electric wires 80, each of the connecting portions 82 of the electric wire 80 protrudes from one of the axial end faces of the stator core 60 to connect one circumferentially-adjacent pair of the in-slot portions 81 of the electric wire 80. Consequently, all of the connecting portions 82 of the electric wires 80 together make up the coil ends of the stator coil 70.

Furthermore, for each of the electric wires 80, one end of the electric wire 80 protrudes from a most radially outer part of one of the slots 61 of the stator core 60; the other end of the electric wire 80 protrudes from a most radially inner part of another one of the slots 61 of the stator core 60. Further, both the ends of the electric wire 80 protrude from the same axial end face of the stator core 60. Each of the slots 61 of the stator core 60 receives the in-slot portions 81 of only two of the electric wires 80. Further, in each of the slots 61, the in-slot portions 81 of one of the two electric wires 80 are alternately arranged with those of the other electric wire 80 in the radial direction of the stator core 60.

In the stator coil 70, the ends of the phase winding U1 are respectively joined, for example by welding, to the ends of the phase winding U2, forming joining portions 75. Similarly, the ends of the phase winding V1 are respectively joined, for example by welding, to the ends of the phase winding V2, forming joining portions 75. The ends of the phase winding W1 are respectively joined, for example by welding, to the ends of the phase winding W2, forming joining portions 75. As shown in FIG. 1, all of the joining portions 75 are so formed as to protrude from one of the coil end of the stator coil 70.

After having described the overall configuration of the dynamoelectric machine 100 and the detailed configuration of the stator 50, the method of manufacturing the stator 50 according to the present embodiment will be described hereinafter.

In the present embodiment, the method of manufacturing the stator 50 includes an electric wire-shaping step, an electric wire assembly-forming step, a stator coil-forming step, and a stator-assembling step.

1. Electric Wire-Shaping Step

In this step, twelve straight electric wires are shaped, using a shaping machine (not shown), to form the twelve wave-shaped electric wires 80 as shown in FIGS. 5A-5C.

2. Electric Wire Assembly-Forming Step

In this step, the twelve wave-shaped electric wires 80 are sequentially stacked, as shown in FIGS. 11A-14C, to form the flat band-shaped electric wire assembly 71. In this case, as best seen form FIG. 11B, the electric wires 80 are so stacked as to be deviated from one another in the longitudinal direction of the electric wire assembly 71 by the distance d2 between each circumferentially-adjacent pair of the slots 61 of the stator core 60. It should be noted that in FIGS. 11-14, the reference numerals 1 to 12 represent the numbers of the electric wires 80 in the sequential stacking thereof.

3. Stator Coil-Forming Step

In this step, the flat band-shaped electric wire assembly 71 is rolled, around a cylindrical core member having a predetermined outer diameter (not shown), by a predetermined number of turns (e.g., five turns in the present embodiment) into a hollow cylindrical shape. Further, in this step, the corresponding ends of the electric wires 80 are joined together by, for example, welding. As a result, the stator coil 70 is obtained which has a hollow cylindrical shape as can be seen from FIG. 2.

4. Stator-Assembling Step

In this step, the stator core 60 is assembled to the stator coil 70, thereby forming the stator 50. More specifically, in the present embodiment, the stator core 60 is made up of 24 stator core pieces 62 as shown in FIG. 4. In this step, the stator core pieces 62 are so mounted to the stator coil 70 that the tooth portions 63 of the stator core pieces 62 are respectively inserted into the spaces formed between circumferentially-adjacent pairs of the in-slot portions 81 of the electric wires 80. Then, all of the back core portions 64 of the stator core pieces 62 are joined to one another by, for example, welding. As a result, the stator 50 is obtained which is shown FIG. 2.

With the above method according to the present embodiment, since the stator coil 70 is formed with the single flat band-shaped electric wire assembly 71, it is possible to minimize the number of the joining portions 75 which join the ends of the electric wires 80, thereby minimizing the size of the stator coil 70.

Referring again to FIG. 1, during operation of the dynamoelectric machine 100, the coolant is discharged by the coolant supplier via the coolant discharge outlets 23a. Then, the coolant, which has been discharged to the coil ends (i.e., the connecting portions 82 of the electric wires 80) of the stator coil 70, further flows along the radially outer surfaces of the coil ends, thereby spreading over the entire stator coil 70. On the other hand, the coolant, which has flowed to the axial end faces of the rotor 40, further flows radially outward with rotation of the rotor 40, passing the coil ends of the stator coil 70.

As described previously, in the present embodiment, for each of the electric wires 80, all of the oblique sections 84a of the apex parts 84 of the connecting portions 82 oblique (or slant) in the same direction. Therefore, the oblique sections 84a of the apex parts 84 of the connecting portions 82 of the electric wires 80 located on one axial side of the stator core 60 are oblique in the same direction as those on the other axial side of the stator core 60.

Figure 15A:
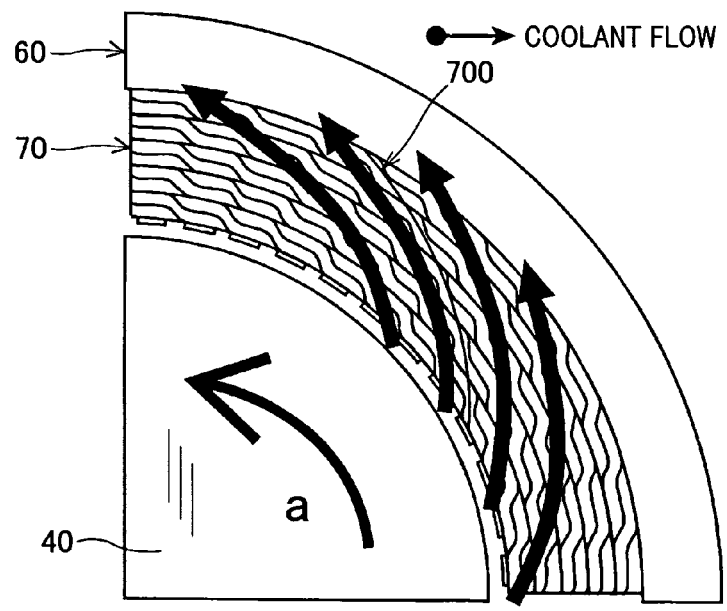
FIG. 15A is a schematic end view illustrating the flow path of a coolant on the axial end face of the stator coil one side of the stator core according to the first embodiment.
Figure 15B:
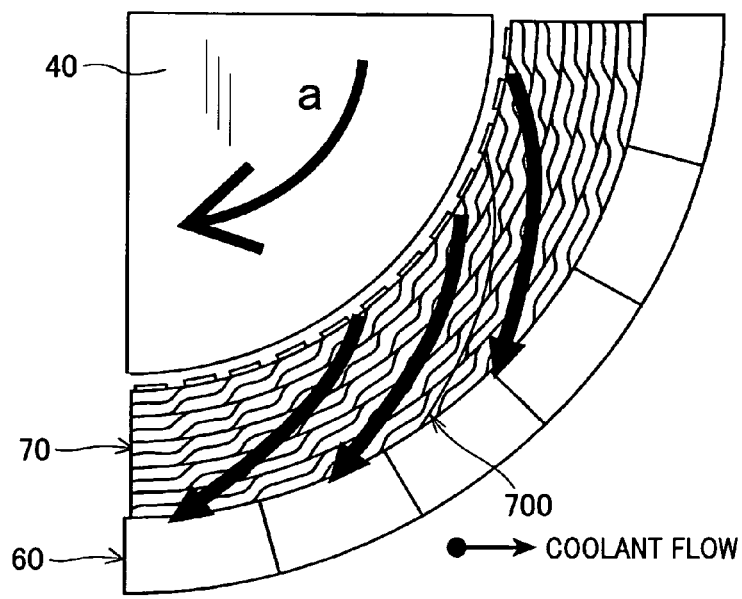
FIG. 15B is a schematic end view illustrating the flow path of the coolant on the axial end face of the stator coil on the other side of the stator core according to the first embodiment.

Consequently, the flow path of the coolant provided on the axial end face of the coil end on one side of the stator core 60 is identical to that provided on the axial end face of the coil end on the other side of the stator core 60; the flow paths are respectively shown in FIGS. 15A and 15B. As a result, it is possible to achieve the same cooling effect on both the axial end faces of the coil ends of the stator coil 70. In other words, both the coil ends of the stator coil 70 can be equally cooled by the coolant.

Moreover, as shown in FIGS. 15A and 15B, the rotating direction of the rotor 40 and thus the flow direction of the coolant can be made, on both the axial end faces of the coil ends of the stator coil 70, coincident with the extending directions of the ridges 700 which are made up of the apexes 84 of the connecting portions 82 of the electric wires 80. It should be noted that for the sake of simplicity, only one of the ridges 700 is indicated with a solid line in each of FIGS. 15A and 15B. Consequently, the coolant can smoothly flow along both the axial end faces of the coil ends of the stator coil 70, thereby effectively cooling both the coil ends.

Second Embodiment

This embodiment illustrates a method of manufacturing a stator for the dynamoelectric machine 100, which is different from the method according to the previous embodiment.

As in the previous embodiment, the method according to the present embodiment also includes an electric wire-shaping step, an electric wire assembly-forming step, a stator coil-forming step, and a stator-assembling step.

1. Electric Wire-Shaping Step

In this step, a total of 48 straight electric wires are shaped, using a shaping machine (not shown), to form four groups of wave-shaped electric wires 80 as shown in FIGS. 5A-5C. Each of the four groups includes twelve electric wires 80. All of the electric wires 80 in the same group have the same length. However, the electric wires 80 in different groups have different lengths.

2. Electric Wire Assembly-Forming Step

In this step, the twelve wave-shaped electric wires 80 of each of the four groups are sequentially stacked, as shown in FIGS. 11A-14C, to form a flat band-shaped electric wire assembly. As a result, four flat band-shaped electric wire assemblies 71a, 71b, 71c, and 71d (not shown) are obtained which have different lengths.

3. Stator Coil-Forming Step

In this step, each of the four flat band-shaped electric wire assemblies 71a-71d is rolled, around a cylindrical core member having a predetermined outer diameter (not shown), by a single turn. As a result, four hollow cylindrical electric wire assemblies 77a, 77b, 77c, and 77d are obtained which have different inner and outer diameters as shown in FIGS. 16A-16D. In addition, the outer diameter of the assembly 77a is substantially equal to the inner diameter of the assembly 77b; the outer diameter of the assembly 77b is substantially equal to the inner diameter of the assembly 77c; the outer diameter of the assembly 77c is substantially equal to the inner diameter of the assembly 77d.

Figure 17:
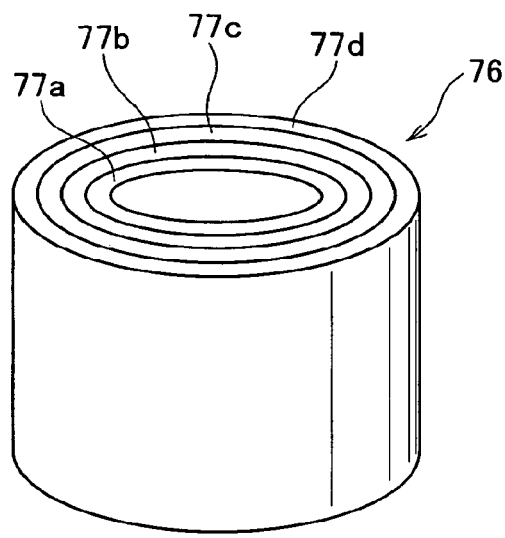
FIG. 17 is a perspective view showing the stator coil according to the second embodiment.
Figure 18:
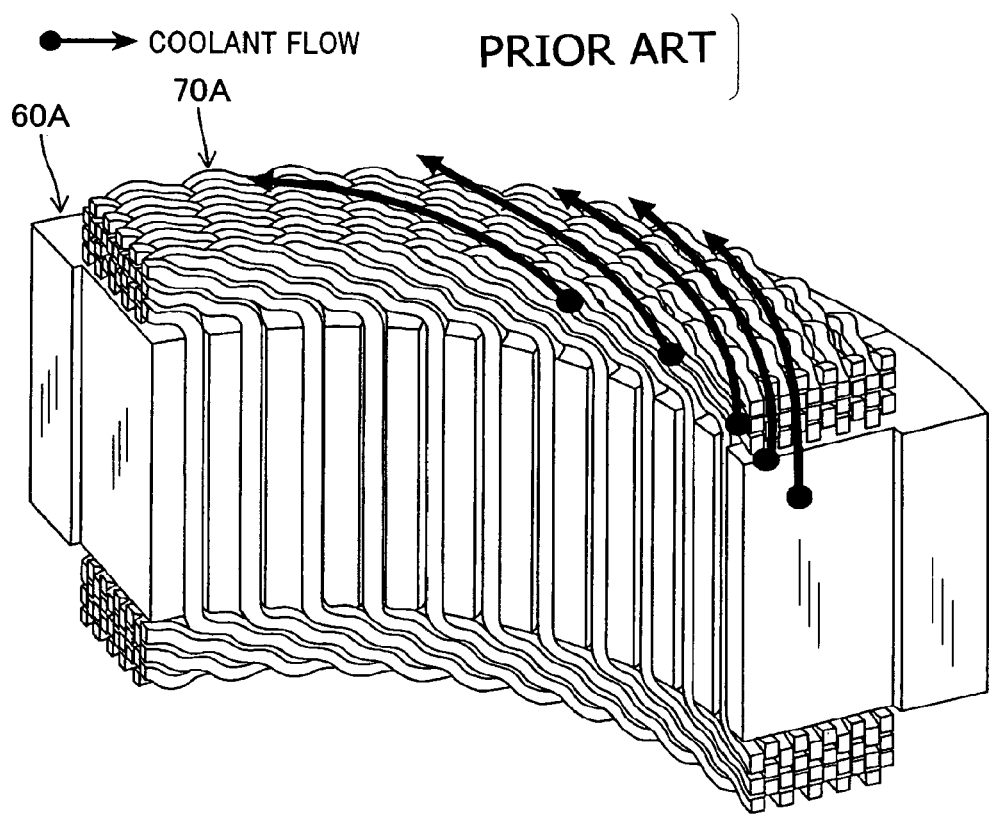
FIG. 18 is a schematic perspective view illustrating the flow of a coolant through a conventional stator.
Figure 19A:
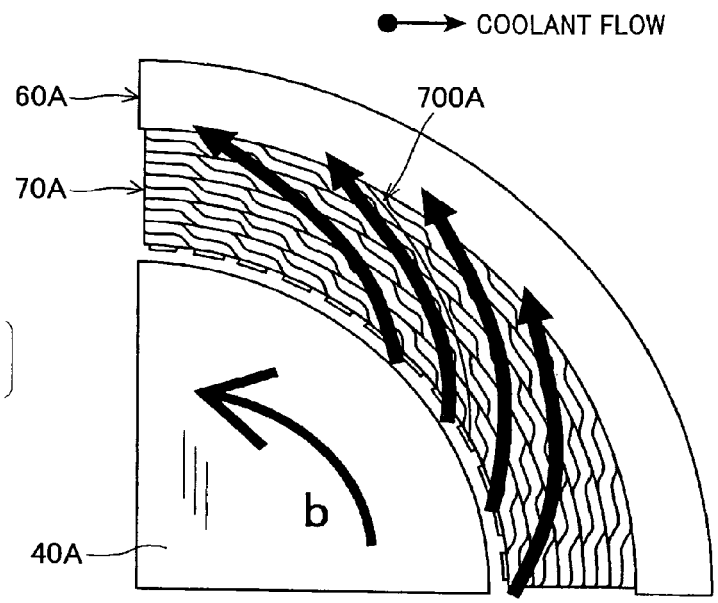
FIG. 19A is a schematic end view illustrating the flow path of the coolant on one axial side of the conventional stator.
Figure 19B:
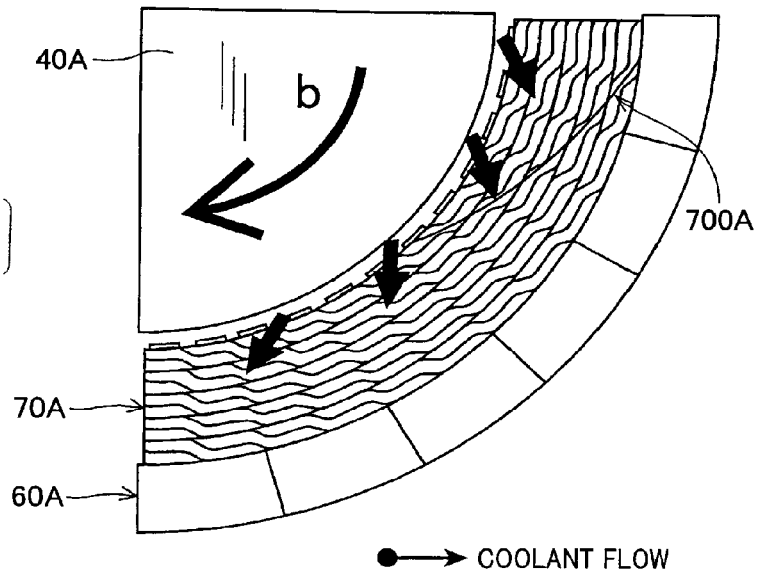
FIG. 19B is a schematic end view illustrating the flow path of the coolant on the other axial side of the conventional stator.

Then, the four hollow cylindrical electric wire assemblies 77a-77d are assembled together, more specifically radially staked together, forming a stator coil 76 as shown in FIG. 17. In addition, in this step, the corresponding ends of the electric wires 80 are joined together by, for example, welding.

4. Stator-Assembling Step

In this step, the stator core 60 is assembled to the stator coil 76, in the same way as in the previous embodiment, thereby forming the stator 50 according to the present embodiment.

As described above, in the present embodiment, the stator coil 76 is formed by radially stacking the hollow cylindrical electric wire assemblies 77a-77d which have different inner and outer diameters. Further, the hollow cylindrical electric wire assemblies 77a-77d are respectively formed by rolling the flat band-shaped electric wire assemblies 71a-71d which have different lengths. Furthermore, the four flat band-shaped electric wire assemblies 71a-71d are respectively formed by using the four groups of the electric wires 80 having different lengths.

Consequently, the lengths of all the electric wires 80 and the lengths of all the flat band-shaped electric wire assemblies 71a-71d are considerably shortened compared to the length of all the electric wires 80 and the length of the single flat band-shaped electric wire assembly 71 in the previous embodiment. As a result, it becomes easier to perform the electric wire-shaping step and the electric wire assembly-forming step, thereby improving the productivity of the stator 50.

While the above particular embodiments of the invention have been shown and described, it will be understood by those skilled in the art that various modifications, changes, and improvements may be made without departing from the spirit of the invention.

What is claimed is:

1. A stator for a dynamoelectric machine comprising:
a hollow cylindrical stator core having a plurality of slots that are formed in a radially inner surface of the stator core and spaced at predetermined intervals in a circumferential direction of the stator core; and
a stator coil made up of a plurality of wave-shaped electric wires mounted on the stator core, each of the electric wires having a plurality of in-slot portions, each of which is received in one of the slots of the stator core, and a plurality of connecting portions each of which is located outside of the slots of the stator core to connect one adjacent pair of the in-slot portions of the electric wire, each of the connecting portions including an apex part that is located axially furthest in the connecting portion from the stator core and includes an oblique section, the oblique section extending obliquely with respect to a radial direction of the stator core with an oblique angle between the oblique section and the radial direction,
wherein
the oblique sections of the apex parts of the connecting portions of the electric wires located on one axial side of the stator core are oblique in the same direction as those located on the other axial side of the stator core.

2. The stator as set forth in claim 1, wherein for each of the electric wires, the oblique angles of the oblique sections of the apex parts of the connecting portions increase from the radially inner side to the radially outer side of the stator core.

3. The stator as set forth in claim 2, wherein the oblique angles of the oblique sections of the electric wires which fall on the same circle are equal to each other.

4. The stator as set forth in claim 1, wherein the oblique angles of the oblique sections of the electric wires which fall on the same circle are equal to each other.

5. The stator as set forth in claim 1, wherein each of the connecting portions of the electric wires is stepped to include a plurality of shoulder parts that extend parallel to an axial end face of the stator core from which the connecting portion protrudes.

6. The stator as set forth in claim 5, wherein the plurality of shoulder parts include two shoulder parts each of which is adjacent to one of the pair of in-slot portions connected by the connecting portion, and there is specified the following dimensional relationship: d1<d2, where d1 is the length of each of two the shoulder parts adjacent to the in-slot portions, and d2 is the distance between each circumferentially-adjacent pair of the slots of the stator core.

7. The stator as set forth in claim 1, wherein for each of the electric wires, the change in radial position of the electric wire caused by one of the oblique sections of the electric wire is substantially equal to the thickness of the electric wire.

8. The stator as set forth in claim 1, wherein each of the electric wires is made up of an electric conductor having a rectangular cross section and an insulating coat covering the surface of the electric conductor.

9. The stator as set forth in claim 8, wherein the insulating coat is two-layer structured to include an inner layer and an outer layer.

10. The stator as set forth in claim 9, wherein the inner layer has a higher glass transition temperature than the outer layer.

11. A method of manufacturing the stator as set forth in claim 1, the method comprising the steps of:
preparing a plurality of electric wires and a plurality of stator core pieces that together make up the stator core as set forth in claim 1;
shaping the electric wires to obtain the plurality of wave-shaped electric wires as set forth in claim 1;
stacking the wave-shaped electric wires to form a flat band-shaped electric wire assembly;
rolling the flat band-shaped electric wire assembly by a predetermined number of turns to form the stator coil which has a hollow cylindrical shape; and
assembling the stator core pieces to the stator coil to form the stator.

12. The method as set forth in claim 11, wherein for each of the wave-shaped electric wires obtained by the shaping step, all of the oblique sections of the apex parts of the connecting portions are oblique in the same direction with respect to a longitudinal axis of the wave-shaped electric wire.

13. A method of manufacturing the stator as set forth in claim 1, the method comprising the steps of:
preparing a plurality of electric wires and a plurality of stator core pieces that together make up the stator core as set forth in claim 1;
shaping the electric wires to obtain the plurality of wave-shaped electric wires as set forth in claim 1, wherein the plurality of wave-shaped electric wires are classified into a plurality of groups so that the wave-shaped electric wires in the same group have the same length, but those in different groups have different lengths;
stacking the wave-shaped electric wires in groups to form a plurality of flat band-shaped electric wire assemblies which have different lengths;
rolling the flat band-shaped electric wire assemblies separately by a single turn to form a plurality of hollow cylindrical electric wire assemblies which have different inner and outer diameters;
assembling the hollow cylindrical electric wire assemblies to form the stator coil; and
assembling the stator core pieces to the stator coil to form the stator.

14. The method as set forth in claim 13, wherein for each of the wave-shaped electric wires obtained by the shaping step, all of the oblique sections of the apex parts of the connecting portions are oblique in the same direction with respect to a longitudinal axis of the wave-shaped electric wire.

* * * * *